US010181231B2

(12) United States Patent
Kristensen et al.

(10) Patent No.: US 10,181,231 B2
(45) Date of Patent: Jan. 15, 2019

(54) CONTROLLING ACCESS TO A LOCATION

(71) Applicant: Bekey A/S, Høje Taastrup (DK)

(72) Inventors: Torben Kristensen, Skovlunde (DK); Luis Rodas Lorenzen, Copenhagen N (DK)

(73) Assignee: Bekey A/S, Høje Taastrup (DE)

( * ) Notice: Subject to any disclaimer, the term of this patent is extended or adjusted under 35 U.S.C. 154(b) by 4 days.

(21) Appl. No.: 15/117,586

(22) PCT Filed: Feb. 18, 2014

(86) PCT No.: PCT/EP2014/053104
§ 371 (c)(1),
(2) Date: Aug. 9, 2016

(87) PCT Pub. No.: WO2015/124168
PCT Pub. Date: Aug. 27, 2015

(65) Prior Publication Data
US 2016/0358397 A1 Dec. 8, 2016

(51) Int. Cl.
*G07C 9/00* (2006.01)
*H04W 12/06* (2009.01)
(Continued)

(52) U.S. Cl.
CPC ..... *G07C 9/00309* (2013.01); *G07C 9/00571* (2013.01); *G07C 2009/00412* (2013.01);
(Continued)

(58) Field of Classification Search
CPC ........... G07C 2009/00412; G07C 2009/00769; G07C 2009/00793; G07C 2209/08;
(Continued)

(56) References Cited

U.S. PATENT DOCUMENTS 5,774,058 A 6/1998 Henry et al.
9,189,900 B1 * 11/2015 Penilla ............... G07C 9/00007
(Continued)

FOREIGN PATENT DOCUMENTS

FR         2839833 A1    11/2003
WO    2014/029774 A1     2/2014

OTHER PUBLICATIONS

International Search Report corresponding to Application No. PCT/EP2014/053104, European Patent Office, dated Nov. 4, 2014; (4 pages).
International Written Opinion corresponding to Application No. PCT/EP2014/053104, European Patent Office, dated Nov. 4, 2014; (6 pages).

*Primary Examiner* — Dionne H Pendleton
(74) *Attorney, Agent, or Firm* — Nixon Peabody LLP

(57) ABSTRACT

A method of controlling access to a location secured by a lock mechanism. An access control management system (ACMS) administrates electronic keys for multiple locations and users carrying mobile units. A lock mechanism controls the lock mechanism at the location. Each of data records associated with lock control units includes key generation data for generating an electronic key for a corresponding lock control unit. A generated key is communicated from the ACMS to the user mobile unit. The key indicates an access right to the location and has an associated lock control unit identifier. The key is communicated from the user mobile unit to the lock control unit at the location, which authenticates the key and, subject to successful authentication of the key, operates the lock mechanism. The key includes a data item cryptographically protected between the ACMS and the lock control unit using a cryptographic key unknown to the user mobile unit.

19 Claims, 4 Drawing Sheets

(51) Int. Cl.
  *G06K 19/00* (2006.01)
  *H04W 12/04* (2009.01)
  *H04L 29/06* (2006.01)
(52) U.S. Cl.
  CPC .............. *G07C 2009/00769* (2013.01); *G07C 2009/00793* (2013.01); *G07C 2209/08* (2013.01); *H04L 63/0492* (2013.01); *H04W 12/04* (2013.01)
(58) Field of Classification Search
  CPC ............ G07C 9/00309; G07C 9/00571; G07C 2009/00865; G07C 9/00857; G07C 9/00904; H04L 63/0492; H04W 12/04; G06Q 10/02
  See application file for complete search history.

(56) References Cited

U.S. PATENT DOCUMENTS

| | | | |
|---|---|---|---|
| 2006/0098690 A1 | 5/2006 | Park | |
| 2009/0256676 A1* | 10/2009 | Piccirillo | E05B 41/00 340/5.65 |
| 2010/0306549 A1 | 12/2010 | Ullmann | |
| 2011/0034482 A1 | 2/2011 | Ly | |
| 2012/0280783 A1 | 11/2012 | Gerhardt et al. | |
| 2013/0176107 A1* | 7/2013 | Dumas | G07C 9/00571 340/5.61 |
| 2013/0259232 A1* | 10/2013 | Petel | H04L 63/0492 380/270 |
| 2017/0287248 A1* | 10/2017 | Aase | G07C 9/00857 |
| 2017/0289147 A1* | 10/2017 | Kyllonen | H04L 63/0861 |

* cited by examiner

CONTROLLING ACCESS TO A LOCATION

CROSS-REFERENCE TO RELATED APPLICATIONS

This application is a U.S. National Stage of International Application No. PCT/EP2014/053104, filed Feb. 18, 2014, which is incorporated herein by reference in its entirety.

TECHNICAL FIELD

The invention generally relates to controlling access to a location, where access to the location is restricted by a lock mechanism. Further the invention relates to an access control system which allows users, such as suppliers of goods or services, to access a location.

BACKGROUND

At many locations access is restricted by access control mechanisms, in particular lock mechanisms for locking doors or other access points. Often, access to residential or commercial buildings involves unlocking a plurality of doors such as an outer or front door, an elevator door, a door to a specific part of a building e.g. to a level or floor before getting to a point of service, such as an apartment door, a mailbox, a service station or a meter for appliances, an area to be cleaned, etc.

For example, in case of delivery of newspapers, the delivery person often has to gain access to a stairway in order to be able to deliver the newspapers at a locked apartment door or to put the newspaper into a mail box. Finding the correct keys in a large bundle of physical keys frequently causes great difficulties to the delivery person, and the locks are frequently exchanged without the delivery company being informed of this. For reasons of security it is also more and more common to lock doors or gates to backyards, residential areas or company properties, where for example refuse containers may be placed, so that the refuse collection firms have a problem quite similar to the firms that deliver newspapers. It will be appreciated that similar problems are faced by postal delivery personal, cleaning companies, emergency physicians, domestic and other care workers, policemen, firemen, artisans, caretakers/superintendents, etc.

Some of the above service providers require access on a daily basis, while others may require access at certain time periods, such as on certain weekdays or at certain times of the day. Furthermore, different services/deliveries may require different access rights, for example firemen, security companies or police may require access to all facilities, while a mailman only requires access to a mailbox.

In order to facilitate flexible and secure management of access rights electronic access control systems exist. In particular, mobile telephones or similar mobile units have been suggested as advantageous carriers of electronic keys, since no physical keys are necessary with such systems. This means that the disadvantage of using physical keys, where keys are easily lost and difficult to find in a large bundle of keys may be overcome. Furthermore, it is very easy to prohibit access to a lock control unit, when the key to this lock control unit is an electronic key, because the access request for obtaining access with an electronic is easy to deny.

US2002180582 discloses an efficient method and a system for controlling access to a location secured by a lock mechanism controlled by a lock control unit, which may provide a high degree of flexibility and a high level of security. This prior art method comprises storing electronic access codes in the lock control unit, and using an electronic key device for requesting access to the location by transmitting a corresponding access code from the electronic key device to the lock control unit. The lock control unit may then compare the transmitted access code with the previously stored access code. The lock control unit activates the lock mechanism only if the access codes match.

EP2085934 discloses a method of controlling access to a location secured by a lock mechanism controlled by a lock control unit comprising means for wireless communication with a mobile unit. The mobile unit of this prior art performs the following steps: storing an electronic key in the mobile unit, the electronic key being indicative of a predetermined access right to the location; automatically searching for the lock control unit of the location, when the mobile unit is in a distance from the lock control unit, where wireless communication between the mobile unit and the lock control unit is established; automatically establishing a connection to the lock control unit; automatically transmitting the electronic key wirelessly to the lock control unit; and causing operation of the lock mechanism controlled by the lock control unit, whereby access to the location is obtained.

The above prior art methods and systems greatly improve the efficiency and security of managing and enforcing access rights of a large number of users and to a large number of locations. However, such systems involve challenges as regards convenience of use, security, and cost of implementation and installation. For example, such a system may require a large number of users to be equipped with their respective mobile units. The user mobile units may be special purpose devices, specifically manufactured for use in a lock control system. This allows an operator of the system to maintain control of which users are equipped with mobile units as well as strict control with the devices themselves. It is a considerable disadvantage of such a system, however, that the users are required to carry an additional electronic device. Furthermore, such a solution increases the costs of manufacturing and operating such a system considerably.

It is thus desirable to provide a secure yet convenient and cost-efficient access control system.

SUMMARY

According to one aspect, disclosed herein is a method of controlling access to a location, the location being secured by a lock mechanism, the system comprising an access control management system adapted to administrate electronic keys for a plurality of locations and a plurality of users, a user mobile unit to be carried by a user, and a lock control unit operationally coupled to the lock mechanism at said location and adapted to control the lock mechanism, the method comprising:

storing, by the access control management system, a plurality of data records associated with respective lock control units, each data record comprising key generation data for generating an electronic key for a corresponding lock control unit;

communicating a generated electronic key from the access control management system to the user mobile unit, the electronic key being indicative of a predetermined access right to said location, the electronic key having associated with it a lock control unit identifier of the lock control unit at said location;

communicating the electronic key from the user mobile unit to the lock control unit at said location;

authenticating, by the lock control unit, the electronic key and, subject to successful authentication of the electronic key, operating the lock mechanism;

wherein the electronic key comprises a data item cryptographically protected between the access control management system and the lock control unit using a first cryptographic key unknown to the user mobile unit and wherein communicating the electronic key from the user mobile unit to the lock control unit further comprises cryptographically protecting the electronic key using a second cryptographic key.

Hence, as the electronic key comprises a component that is cryptographically protected between the access control management system and the lock control unit, the lock control unit may verify that the electronic key is an authentic electronic key originating from the access control management system, even if the electronic key is communicated via a user mobile unit which is not under strict control of the provider/operator of the access control system. The cryptographic protection may comprise authenticity protection and/or encryption of the data item. Generally, a cryptographic key may be any data item operable to determine, when used as a parameter to a cryptographic algorithm or cipher, the functional output of said cryptographic algorithm or cipher. The first cryptographic key may be a first symmetric key shared by the access control management system and the lock control unit, thus providing a computationally efficient cryptographic protection requiring little computational power at the lock control unit. Alternatively, the first cryptographic key may be a private key of an asymmetric-key encryption and/or authentication mechanism where the lock control unit and the access control management system have stored therein respective keys of an asymmetric key system. Similarly, the second cryptographic key may be a second symmetric key shared by the user mobile unit and the lock control unit, thus providing a computationally efficient cryptographic protection requiring little computational power at the lock control unit. Alternatively, the second cryptographic key may be a private key of an asymmetric-key encryption and/or authentication mechanism where the lock control unit and the user mobile unit have stored therein respective keys of an asymmetric key system.

When the data item is encrypted, the user mobile unit can neither get access to nor tamper with the contents of the data item, thereby reducing the risk of unauthorised mobile units generating unauthorised electronic keys or modifying received keys so as to e.g. operate other lock mechanisms. Consequently, embodiments of the method disclosed herein allow an access control system to use user mobile units, such as the user's own mobile phones, that are not under strict control of the access control system operator, while maintaining a high degree of security.

When the encrypted data item comprises a validity period of the electronic key, the user mobile is prevented from tampering with the validity period of the electronic keys. Accordingly, the lock control unit may obtain a current time and operate the lock mechanism subject to successful authentication of the electronic key and conditioned on the obtained current time falling within the validity period. The lock control unit may e.g. comprise a clock or an interface for receiving a clock signal. Alternatively or additionally, the lock control signal may receive a current time from the user mobile unit.

When communicating the electronic key from the user mobile unit to the lock control unit comprises transmitting the electronic key via a wireless communications channel, the user does not need to bring the user mobile unit in physical contact with the lock control unit. The wireless communication channel may be a short-range radio-frequency communication channel, e.g. a Bluetooth communications channel or a communications channel according to any other suitable communications standard. Bluetooth is an industrial specification for wireless personal area networks. Bluetooth provides a way of connecting and exchanging information between devices, which comprise a Bluetooth chip or device, over a short-range radio frequency. Bluetooth devices may communicate over distances such as 5-100 meters. The distance may be adjusted by means of the transmission power of the Bluetooth device which sends information to another Bluetooth device which receives this information. A communications technology such as Bluetooth which allows the mobile unit and the lock control unit to automatically establish radio-communication as soon as the mobile unit is within a certain proximity of the lock control unit allow a particularly efficient access control mechanism. It is an advantage of this embodiment that the communication is based upon reliable standard components which are available as part of many devices, such as mobile phones, personal digital assistants, or the like.

When the electronic key comprises an operational parameter causing the lock control unit to operate the lock mechanism using the operational parameter, operation of the lock mechanism may conveniently be configured e.g. to meet specific needs of the user and/or the user mobile unit.

For example, in some embodiments, the transmission may be initiated when the user mobile unit enters a range of a wireless communications channel. As the transmission of the electronic key from the user mobile unit takes a certain period of time, and since the user may continue to approach the door or similar access point during this period of time, the lock control unit may be ready to operate the lock mechanism when the user is still at a certain distance from the door. Moreover, certain users may routinely need additional time when arriving at a door, e.g. to identify or sort items to be delivered at that location, verify services to be performed at that location, and/or the like. Consequently, the lock control unit may activate the lock mechanism too early for the user to actually have reached the access point or otherwise be ready to access the location. The lag time between reception of the electronic key and activation of the lock mechanism may be configured for individual lock mechanisms, e.g. by adjusting a signal strength of a radio-transmitted and thus the range of the wireless communication, and/or by pre-configuring the lock control unit with a predetermined lag time. However, different users may have different walking speed or otherwise different needs, and different user mobile units may have different transmission and/or reception characteristics.

When the electronic key comprises a delay parameter, the lock control unit may delay activation of the lock mechanism by a period of time specified by the delay parameter. Consequently, the relative timing of the activation of the lock mechanism may conveniently be adapted to e.g. different walking speeds of different users, other needs of different users, changing reception conditions at the location of the lock control units, different types and performance characteristics of user mobile units, etc. The delay parameter may specify the desired delay from any suitable reference time, e.g. from the time of reception of the electronic key by the lock control unit, from the time of successful authentication of the electronic key by the lock control unit, from a transmission time indicated by a transmission time stamp transmitted by the user mobile unit together with the electronic key, and/or the like. Different delay parameters may e.g. be stored for each user and/or for each lock control unit and/or for each user mobile unit by the access control management system and communicated to the user mobile unit together with or as a part of the electronic key. Alternatively or additionally, the user mobile unit may have stored therein a user-configurable delay parameter. For example, such a delay parameter may be indicative of an absolute time, or of a relative parameter (e.g. a factor or increment) by which a pre-set lag time is to be modified. Hence, different relative parameters may be associated with each user and/or each user mobile unit and/or each lock control unit. A pre-configured lag time may this be adjusted by one or multiple relative parameters.

Similarly, when the electronic key comprises a duration parameter causing the lock control unit to keep the lock mechanism activated for a period of time specified by the duration parameter, a user may enter during a period of time, thus reducing the risk that the lock mechanism is activated too late or too early. For example, the lock control unit may send an activation signal to the lock mechanism for a duration specified by the duration parameter.

Alternatively or additionally, the electronic key may comprise one or more parameters controlling repeated activation of the lock mechanism. To this end the electronic key may comprise a parameter specifying a number of repetitions and/or a parameter specifying a time interval between activations. Consequently, transmission of a valid electronic key causes the lock control unit to activate the lock mechanism a number of times and/or at a given frequency, thus reducing the risk that the lock mechanism is activated too late or too early for the user to enter the location upon arrival and without undue delay.

It will be appreciated that some or all of the above parameters may be combined. For example, the lock control unit may control to initiate the first activation after a certain delay time and then repeat activation a certain number of times and at certain intervals; each activation may have a certain duration.

Each of the above operational parameters may be included in the encrypted data item, thus preventing the user mobile unit from tampering with these operational values. Alternatively, some or all of the parameters may be included in the electronic key in addition to and separate from the encrypted data item. In some embodiments, the electronic key comprises at least one data item, e.g. the lock control unit identifier and/or other parameters, readable by the mobile unit in addition to the encrypted data item. Alternatively or additionally, such data items that are readable by the user mobile unit may be communicated from the access control management system to the mobile unit as a separate data item together with the electronic key, e.g. included in the same message or data packet. Moreover, some of the operational parameters may even be set by the user mobile unit, e.g. as user-configurable parameters.

In some embodiments communicating the electronic key from the user mobile unit to the lock control unit comprises encrypting the electronic key and/or verifying the authenticity of the lock control unit and/or the user mobile unit. In some embodiments, the authentication and/or encryption are performed based on a second symmetric key shared between the user mobile unit and the lock control unit. To this end, the user mobile unit may receive the second symmetric key from the access control management system, e.g. together with or as a part of the electronic key.

Similarly, communicating the electronic key to the user mobile unit from the access control management system may comprise authenticating, by the access control management system, the user mobile unit and/or a user of the user mobile unit, thereby ensuring that electronic keys are only distributed to user mobile units of authorised users. To this end, sending an electronic key by the access control unit may be made subject to a login procedure based on predetermined user credentials such as user name and password, though any other user authentication mechanism may be used.

The electronic key may be any data item suitable for authenticating an access right by the lock control unit. In particular, the electronic key comprises a data item encrypted by a first cryptographic key unknown to the user mobile unit, e.g. a first symmetric key shared by the lock control unit and the access control management system and/or a data item and a message authentication code authenticating the data item based on a first symmetric key shared by the lock control unit and the access control management system. The lock control unit and the access control management system may thus each comprise a first symmetric key shared by the lock control unit and the access control management system. The first symmetric key may be established during manufacturing of the lock control unit and stored in the lock control unit as well as in the access control management system, e.g. associated with the lock control unit identifier.

In some embodiments an electronic key comprises a data item encrypted using a first symmetric key known only to the access control management system and the lock control unit, where the data item includes a validity period of the electronic key. The electronic key further comprises or is otherwise associated with a lock control unit identifier identifying the lock control unit, another, second cryptographic key for use by the user mobile unit for encrypting and/or authenticating data exchanged between the user mobile unit and the lock control unit; and one or more operational parameters such as a delay parameter, a duration parameter, a repetition parameter, a repetition interval parameter, and/or the like.

The lock control unit identifier may be any suitable form of identifier for uniquely identifying a lock control unit among a plurality of lock control units. For example, the lock control unit may be a hardware identifier associated with the lock control unit or one of its components. For example, the lock control unit identifier may be an identifier associated with the communications device of the lock control unit for wireless communication with mobile units, e.g. a device address or identifier suitable for identifying the communications device in a communication system or network. For example, every Bluetooth device has a unique identity, the Bluetooth device address, which may serve as a lock control unit identifier and be used in order to identify a specific lock control unit by a mobile unit which is searching for other Bluetooth devices in the surroundings. Hence, an example of a suitable lock control unit identifier is a Bluetooth device address.

In some embodiments the method further comprises
    detecting one or more lock control units communicating via a wireless communications channel in a proximity of the user mobile unit;
    identifying, based on the lock control unit identifier, the lock control unit associated with the location.

Responsive to the identification of the lock control unit, the user mobile unit or the lock control unit may automatically initiate the transmission process for transmitting the electronic key associated with the identified lock control unit, e.g. by initiating an authentication and/or key exchange process for mutually authenticating the lock control unit and the user mobile unit and/or securing the communications channel between the lock control unit and the user mobile unit.

In some embodiments, detecting one or more lock control units communicating via the wireless communications channel in a proximity of the user mobile unit comprises detecting all electronic devices communicating via the wireless communications channel within a communication range of the user mobile unit, and, for each detected device, determining whether the detected device is a lock control unit. Alternatively, the lock control unit may scan for electronic devices within a communication range of the lock control unit, and determine whether the detected device is a user mobile unit.

The detection of the one or more lock control units communicating via the wireless communications channel in a proximity of the user mobile unit may be performed automatically by the user mobile unit, e.g. by means of a wireless communication/interaction between the user mobile unit and a lock control unit at the location. The determination whether the detected device is a lock control unit may e.g. be based on one or more communications parameters, e.g. a service parameter, an automatic handshake or recognition protocol, a device ID or network address of the lock control unit, and/or the like.

If the process identifies more than one lock control unit in a proximity of the user mobile unit, the user mobile unit selects a lock control unit for which it has stored an electronic key. If there are more than one such units, the user mobile unit selects one of them, e.g. the one that was detected first.

In some embodiments, the method further comprises, receiving, by the user mobile unit, a message form the lock control unit indicative of at least one operational parameter of the lock control unit; and sending a message indicative of the received operational parameter to the access control management system. Hence, an efficient mechanism is provided for communicating operational information of the lock control units to the access control management system via the user mobile unit, thus allowing the access control management system to monitor operation of the lock control units and/or detect lock control units that are not operating properly or that otherwise require maintenance. It is a further advantage that the lock control unit does not need any other communications means or interface for communicating with the access control management system or another entity to detect lock control.

In particular, in some situations, it may be difficult or even impossible to connect the lock control unit with an external power source. In such situations it may be desirable to provide the lock control unit with a battery. It would thus be unfortunate when the lock control unit fails to function properly due to an unexpected low battery level. Accordingly, in some embodiments the lock control unit comprises a battery for providing power to the lock control unit, and the operational parameter comprises a battery status of the battery.

A location may be a physical location, such as a building, an area, or some other residential, industrial, commercial or office facility, where access to the location is controlled by a lock mechanism, such as a physical lock at a door, a window, a gate or the like. Access to the location may be controlled at a single point of entry or at a plurality of access points. Furthermore, a location may also be a part of a building, area, etc., and, according to the invention, access to different parts of a location may be controlled individually, such as at an outer gate, a front door, within an elevator granting access at all or selected floors, at doors to individual apartments, offices, sections, rooms, storage facilities, such as drawers, safes, etc. The location may be stationary, such as a building, or mobile such as a vehicle, a container, a ship, or the like. Furthermore, the location may also be an installation, such as a control unit of industrial facility, an electric meter, a computer system or the like, where access to the location is controlled by a lock mechanism, such as a lock at a control box, or an electronic lock, such as a hardware lock of a computer. The term access to a location may also comprise user access to a computer or computer program where access is controlled by a software lock mechanism restricting access to a software application, to stored data, communications facilities, or the like. An access right according to the invention may be the right to interact with a location. Examples of access rights include the right to enter a building, an area, a facility, etc., the right to operate a machine, a device, a vehicle, a computer, etc., the right to open or close a door, a window, a container, a box, etc., and the right to receive or deliver goods, data information, etc., as long as the access right can be controlled by a lock mechanism.

The features of embodiments of the method described herein may be implemented in software and carried out on a mobile device or other data processing system caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The present invention relates to different aspects including the method described above and in the following, corresponding methods, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, according to one aspect, disclosed herein is a method of managing access control to a plurality of locations, each location being secured by a respective lock mechanism, each lock mechanism being controlled by a lock control unit, the lock control unit having associated with it a lock control unit identifier, the lock control unit comprising means for wireless communication via a wireless communications channel with a user mobile unit, and adapted to receive an electronic key from a user mobile unit, to verify a received electronic key and, subject to successful verification, to activate the lock mechanism, the method comprising performing the following step by an access control management system:

sending a message to a user mobile unit, the user mobile unit comprising means for wireless communication via the wireless communications channel with the lock control unit, the message comprising an electronic key, wherein at least a data item comprised in the electronic key is cryptographically protected between the access control management system and the lock control unit using a first cryptographic key unknown to the user mobile unit, e.g. using a first symmetric key shared by the lock control unit and the access control management system. The message may further comprise a second cryptographic key for protecting the communication between a user mobile unit and the lock control unit.

According to a further aspect, disclosed herein is an access control management system configured to perform each step of the method of managing access control to a plurality of locations described herein. The access control management system may be a suitably programmed data processing system. The access control management system may comprise a database having stored therein data records of a plurality of lock control units. Each data record indicative of a lock control unit may comprise or be associated with a lock control unit identifier and a first cryptographic key—e.g. a symmetric key or a public key of an asymmetric-key system—for cryptographically protecting said data item comprised in the electronic key. Each data record may further comprise a second cryptographic key for protecting the communication between a user mobile unit and the lock control unit.

The database of the access control management system may further have stored therein data records indicative of a plurality of respective locations; each data record indicative of a location may comprise or be associated with an address. During a configuration process, the access control management system may be adapted to establish an association between a data record indicative of a location and a data record indicative of a lock control unit. The access control management system may have further stored therein operational parameters associated to respective users and/or associated with respective user mobile units and/or associated with respective lock control units.

According to yet a further aspect, disclosed herein is a user mobile unit configured to perform at least the following steps of a method of controlling access to a location described herein:
  receiving an electronic key from an access control management system, the electronic key being indicative of a predetermined access right to the location, the electronic key having associated with it a lock control unit identifier of a lock control unit associated with the location;
  sending the electronic key to the lock control unit causing the lock control unit to authenticate the electronic key and, subject to successful authentication of the electronic key, to operate a lock mechanism;
wherein the electronic key comprises a data item cryptographically protected between the access control management system and the lock control unit using a first cryptographic key unknown to the user mobile unit and wherein sending the electronic key to the lock control unit further comprises cryptographically protecting the electronic key using a second cryptographic key.

The user mobile unit may be a specifically designed, portable unit for use in the access control system described herein. Alternatively, a user mobile unit may be a mobile communications device, such as a mobile telephone, smart phone, or the like, for voice and/or data communication via a cellular telecommunications network. Many such devices comprise short range, wireless communications interfaces allowing communication with a lock control unit, and they can be programmed by suitable software to perform the steps of embodiments of the process described herein.

According to yet another aspect, disclosed herein are embodiments of a lock control unit. The lock control unit is connectable to and adapted to control a lock mechanism for securing a location, the lock control unit having associated with it a lock control unit identifier and a key verification data item allowing verification of a data item cryptographically protected between the access control management system and the lock control unit using a first cryptographic key unknown to the user mobile unit. The key verification data item may be a first symmetric key of a symmetric-key system shared between the access control management system and the lock control unit, or a public key and/or a private key of an asymmetric-key system established between the lock control system and the access control management system, allowing the lock control unit to verify the authenticity of the data item and/or to decrypt an encrypted data item originating from the access control management system. The lock control unit comprises a processing unit and first wireless communications means adapted to communicate with wireless communication means of a user mobile unit, the lock control unit being configured to receive an electronic key from a user mobile unit, to verify the received electronic key based on the key verification data item stored in a memory of the lock control unit and, subject to successful verification, to activate the lock mechanism; and wherein communication of the electronic key from the user mobile unit to the lock control unit is cryptographically protected using a second cryptographic key.

In some embodiments, the lock control unit is further adapted to send a message to the user mobile unit indicative of one or more operational parameters of the lock control unit.

According to another aspect a computer program comprises program code means for causing a data processing system or device to perform some or all of the steps of one or more of the methods disclosed herein, when said computer program is executed on the data processing device or system. In particular, one embodiment of a computer program may be configured to be executed by a user mobile unit and to cause the mobile unit to perform the steps of the method disclosed herein that are performed by the user mobile unit. Another embodiment of a computer program may be configured to be executed by an access control management system and to cause the access control management system to perform the steps of the method disclosed herein that are performed by the access control management system. Yet another embodiment of a computer program may be configured to be executed by a lock control unit and to cause the lock control unit to perform the steps of the method disclosed herein that are performed by the lock control unit.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
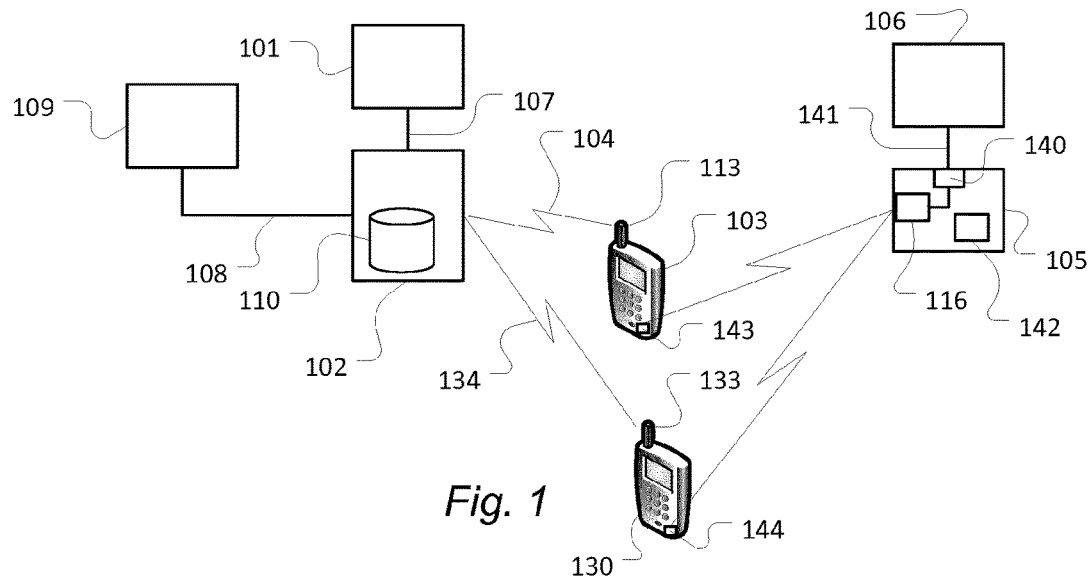
FIG. 1 schematically illustrates an access control system.

FIG. 1 schematically illustrates an access control system. The system comprises an access control management system 102, an access right management system 101, a user mobile unit 103, a lock control unit 105, a lock mechanism 106, and a technician mobile unit 130. For ease of illustration, FIG. 1 only shows a single user mobile unit, a single technician mobile, a single lock control unit, and a single lock mechanism. It will be appreciated, however, that embodiments of an access management system typically comprise a plurality of each of these units, as the access control system typically manages access to a plurality of locations, each location having one or more lock control units associated to it, and manages access rights of a plurality of users, each user having an associated user mobile unit. Likewise, embodiments of the system may include a plurality of technician mobile units, thus allowing a plurality of technicians to concurrently support the lock control units of the system. An embodiment of the access control system may further comprise more than one access right management systems, e.g. a system of a newspaper delivery company, another system of a domestic care company, and/or the like.

Each of the access control management system 102 and the access rights management system 101 may be implemented as a separate, suitably programmed data processing system. The respective systems may communicate with each other via any suitable communications interface 107, e.g. a computer network or other communications network. Alternatively, the access control management system and the access rights management system may be implemented as separate software systems executed on the same data processing system and communicating with each other via any suitable data communications mechanism, such as a suitable API, a common database, and/or the like.

The access right management system 101 may be a data processing system managing the access rights of a plurality of users to a plurality of locations. For example, the access right management system may be a data processing system of a service company, e.g. a cleaning company, a home care company, a security company, a delivery company, etc., managing access rights of its service personnel to the locations at which the service company performs its service.

For example, a newspaper company has a number of subscribers who are to have their newspaper delivered to their respective residence. Information on the subscribers may be kept in a database of (or accessible to) an access right management system of the newspaper company. The information on subscribers may comprise their residence address, when they should receive a newspaper etc. In this example, the access right management system may send a request to the access control management system including information about the delivery persons who are to be granted access to certain locations, and optionally additional attributes, such as timing information regarding the access right, etc. In one embodiment, the access rights management system may send the information in the form of data records, each record including a user identifier identifying a user to be granted access, a location identifier identifying the location to which the user is to be granted access to, and a validity period indicative of the time or time interval during which access is to be granted. For example, the user identifier may be a username or any other suitable identifier. The location identifier may be a street address or any other suitable identifier.

The access control management system 102 may comprise an access control database 110 having stored therein user records identifying registered users. Each user record may be identified by a user identifier or other suitable key and additional information regarding the user such as an identifier identifying a mobile unit associated with the user, user credentials allowing authentication of the user when the user requests access keys, and/or additional or alternative information. Each user record may further comprise user-specific operational parameters such as user-specific delay times, etc. The access control database may further comprise location records identifying locations. Each location may include an address identifying a street address of the location and each location record may identify a lock control unit associated to that location. The database may further comprise lock control unit records associated with respective lock control units. Each lock control unit record may comprise information about a communications address, a first cryptographic key for encrypting data between the access control system and the lock control unit, a second cryptographic key for encrypting messages between a user mobile unit and the lock control unit, and optionally further attributes such as configurable operational parameters of the lock control unit, e.g. delay parameters, etc. The communications address may e.g. comprise a Bluetooth device address or other suitable address identifying the lock control unit in a suitable communications technology allowing a mobile unit to identify and communicate with the lock control unit using said communications technology. It will be appreciated that such a database may be organised in a variety of ways so as to associate lock control units with respective locations, to associate mobile units with respective locations, and optionally to associate users with respective mobile units. Hence, based on the information received from the access rights management system, the access control management system may identify which mobile units are to receive which electronic keys.

The access control management system 102 may further comprise an interface 108 to a lock control unit manufacturer system 109, e.g. a data processing system of a manufacturer of lock control units. The access control system may receive data associated with newly manufactured lock control units directly from the lock control unit manufacturer system. These data may include a lock control unit identifier and electronic key generation data associated with each lock control unit.

The user mobile unit 103 may be a mobile phone, a PDA (personal digital assistant), a handheld computer, another terminal that is adapted to emit a Bluetooth or other radio-based signal or other type of signal which can be received by a lock control unit controlling access to the location, and to communicate with the access control management system. A mobile unit may also be mountable on or in a vehicle.

The user mobile unit 103 is equipped with a communications interface 143 for transmitting signals via a wireless communications channel to the lock control unit 105. The communication may utilise Bluetooth or other radio communication, or any other suitable communications technology. The communication may follow a proprietary protocol or, preferably, a standard protocol such as Bluetooth, TCP/IP, IrDa, a telephone data protocol, a mobile telephone data protocol, http, sound, etc. The information may be transferred either using a proprietary data format or, preferably, a standard format, such as wml, html, binary code, machine code, AT-commands, voice commands or the like.

The user mobile unit 103 is equipped with a communications interface, for example the transmit/receive aerial (antenna) 113 and associated radio communications circuitry of a mobile phone, allowing the mobile unit 103 to establish data communication with the access control management system 102. The communication may be a radio-based communication, preferably via a standard communications network for example a standard mobile telephone network. Via the communications link 104 between the mobile unit 103 and the access control management system 102, electronic keys may be transmitted from the access control management system 102 to the mobile unit 103. Furthermore, log data may be transmitted from the mobile unit 103 to the access control management system 102 via the communications link 104. This data transmission may utilise the so-called Short Message Service (SMS) or other higher speed data channels, e.g. GSM data, WAP or various data channels of CDMA transmission systems. Alternatively or additionally, other suitable communications channels using a proprietary or standard protocol such as TCP/IP, http, voice messages, etc. may be used.

A user mobile unit 103 can be used by a user, e.g. a newspaper delivery man, to gain access to a location, e.g. a locked stairway in a building, where subscribers have their residence. Before the mobile unit 103 can be used in the access control system, the mobile unit may need to be registered with the access control management system 102. For example, in embodiments, where the mobile unit is implemented as a mobile telephone, the telephone number of the mobile unit 103 may be set up in the access control management system 102. The telephone number may be related to a SIM card which is inserted in the mobile unit 103. In alternative embodiments, no registration of the user mobile unit with the access control management system is required. The mobile unit may have stored thereon an application such as a Java program, a mobile application, or the like, programmed to communicate with the access control management system to receive access keys, and to communicate with the lock control units to send a corresponding access key. The application may be installed on the mobile unit during an initial setup and/or registration process.

When data items comprising electronic keys are received by the user mobile unit 103 from the access control management system 102, they may be stored in a memory of the mobile unit or on a memory associated with the mobile unit, e.g. the SIM card. The electronic keys may be stored in encrypted form, e.g. encrypted using an encryption key available only to the user mobile unit, e.g. based on a unique hardware identifier of the user mobile unit. Consequently, users are prevented from moving received electronic keys to other mobile units. The user mobile unit 103 may be adapted to automatically initiate the transmission of the electronic key via the wireless communications channel to a corresponding communications interface 116 of the lock control unit 105. The wireless communications technology, such as Bluetooth, used for communicating electronic keys between the user mobile unit 103 and the lock control unit 105 may allow for an automatic mechanism for initiating communication and exchanging data when the mobile unit enters a communications range of the lock control unit. This allows for a fast transmission of the electronic key to the lock control unit 105 and, therefore, a short response time from when the mobile unit 103 approaches the lock control unit until an activation of the lock mechanism 106 to grant the user of the user mobile access to the location. Furthermore, the Bluetooth transmission has the advantage that it does not involve costs for using a communications network.

The technician mobile unit 130 may be a mobile phone, a PDA (personal digital assistant), a handheld computer, another terminal that is adapted to emit a Bluetooth or other radio-based signal or other type of signal which can be received by a lock control unit, and to communicate with the access control management system.

The technician mobile unit 130 is equipped with a communications interface 144 for transmitting signals to the lock control unit 105 using the same wireless communications channel as the communication between the user mobile unit and the lock control unit. The technician mobile unit 130 is further equipped with a communications interface, for example the transmit/receive aerial (antenna) 133 and associated radio communications circuitry of a mobile phone or other wireless communications device, allowing the technician mobile unit 130 to establish data communication with the access control management system 102. The communication may be a radio-based communication, preferably via a standard communications network for example a standard mobile telephone network. Via the communications link 134 between the technician mobile unit 130 and the access control management system 102, task lists, electronic keys and commands may be transmitted from the access control management system 102 to the technician mobile unit 130. Furthermore, log data may be transmitted from the technician mobile unit 130 to the access control management system 102 via the communications link 134. This data transmission may utilise the so-called Short Message Service (SMS) or other higher speed data channels, e.g. GSM data, WAP or various data channels of CDMA transmission systems. Alternatively or additionally, other suitable communications channels using a proprietary or standard protocol such as TCP/IP, http, voice messages, etc. may be used. The communications channel 134 used for communicating between the technician mobile unit 130 and the access control management system 102 may be the same or a different communications channel as is used for communication between a user mobile unit 13 and the access control management system 102. For example, the technician and user mobile units may use different mobile telecommunications networks.

A technician mobile unit 130 can be used by a technician, such as a locksmith, to configure and/or test a newly installed or existing lock control unit 105. Before the technician mobile unit 130 can be used in the access control system, it may need to be registered with the access control management system 102, e.g. in a similar manner as a user mobile unit. The communication and operation of a technician mobile unit may be similar as a user mobile unit. However, the technician mobile unit is configured to perform configuration tasks. To this end, the technician mobile unit may have stored thereon an application such as a Java program, a mobile application, or the like, programmed to communicate with the access control management system and with the lock control units. The application may be installed on the mobile unit during an initial setup and/or registration process.

The lock control unit 105 comprises a communications interface 116, e.g. a Bluetooth device, for communicating with user mobile units 103 and technician mobile units 130. The lock control unit 105 is further connected to the lock mechanism 106.

The lock control unit further comprises a processing unit 140 which is adapted to verify received electronic keys. To this end, the lock control unit has stored thereon a first symmetric key for protecting messages between the access control management system and the lock control unit and a second symmetric key for protecting messages between the lock control unit and user mobile units. Alternatively, the first and/or the second key may be asymmetric keys. If the received electronic key is valid, the processing unit may send a control signal to the lock mechanism 106 for operating the lock mechanism and thereby granting access to the location. The lock control unit may further comprise a battery 142 or other suitable energy source. Alternatively or additionally, the lock control unit may receive electrical power from an external energy source.

The lock mechanism 106 may be a door lock system, a valve control system, or the like. The connection 141 between the lock control unit and the lock mechanism may be an electrical or mechanical connection or a wireless communications link. Alternatively, instead of a separate lock mechanism 106, the lock control unit 105 itself may contain corresponding electrical, electronic and/or mechanical components, such as an electric engine which could open a valve, or an electric device which could open a door. The lock mechanism 106 comprises a unit which, for example via an electrical/electronic relay, can activate a lock (not shown) which is for example mounted on a door. The lock mechanism 106 may be connected to an existing door telephone system in a building, or it may be adapted to operate independently, via its own mechanical parts and its own power supply.

The lock control unit may thus be added to an existing electrical system, which is otherwise used to perform unlocking of the door, e.g. from a telephone in a flat which is connected to the entry telephone. The lock control unit may thus work in parallel with an entry telephone or another suitable lock control system. Since entry telephones or similar lock systems are already installed at many doors which give access to flats, it may be easy, fast and non-expensive to provide a control module to these existing lock systems, where the control module may comprise a Bluetooth receiver, an electrical power input and an output for controlling the opening of the lock.

Figure 2:
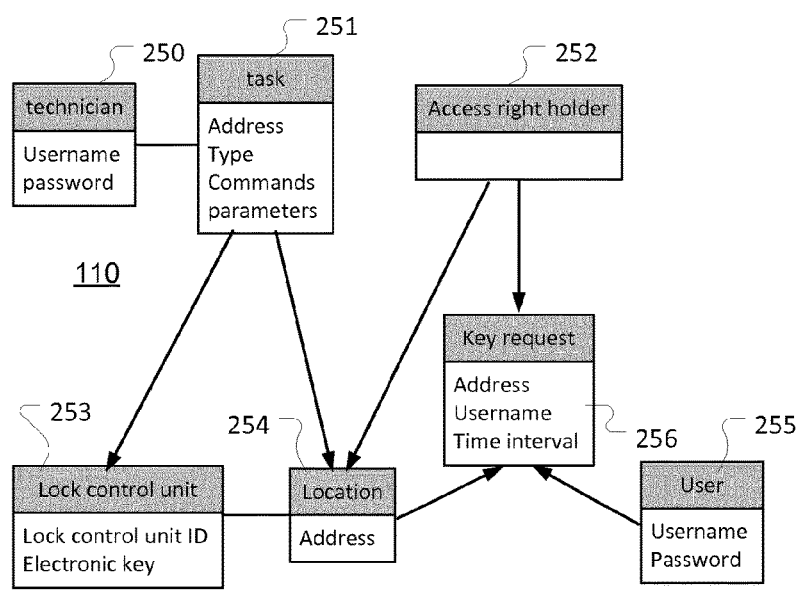
FIG. 2 illustrates an example of a database structure of a database of an access control management system.

FIG. 2 illustrates an example of a database structure of a database 110 of an access control management system, e.g. access control management system 102 of FIG. 1. The database may be implemented as a relational database comprising a plurality of tables. It will be appreciated, however, that the database may be implemented as any other suitable database structure.

The database comprises a table 254 of location records, each location record identifying a location. Each location record may e.g. comprise a field indicative of the address of the location.

The database further comprises a table 253 of lock control unit records, each identifying a lock control unit. Each lock control unit record may comprise respective fields indicative of the lock control unit ID and electronic key generation data for one or more electronic keys associated with the lock control unit. The electronic key generation data comprises the first symmetric key suitable for generation of an electronic key e.g. by encrypting a data item, by generating a message authentication code, or the like. Alternatively, the electronic key generation data may comprise a first public key of the lock control unit. The key generation data further comprises a second symmetric key (or a suitable public key of the lock control unit) to be communicated to a user mobile unit for protecting communication between the user mobile unit and the lock control unit. The lock control unit ID may be a serial number of the lock control unit. Alternatively the lock control unit may be an identifier that identifies the communications device of the lock control unit in the communications protocol used by the lock control unit. For example, in embodiments where the lock control unit communicates with user mobile units and technician mobile units via a Bluetooth communications channel, the lock control unit ID may be the Bluetooth device address of the Bluetooth transceiver of the lock control unit. The access control management system may receive the lock control unit records from the manufacturer of the lock control units. Each lock control record may have further attributes associated with it such as operational parameters, e.g. a delay parameter, a duration parameter, a repetition number and/or repetition interval.

The database further comprises a table 252 of access right holder records, each indicative of an access right holder. Each access right holder may be associated with one or more locations, and each location may have one or more access right holders associated with it. An access right holder may be the owner of the location or another party to which access right has been granted, e.g. a service company, a newspaper company, a delivery company, etc.

The database further comprises a table 255 of user records, each identifying a user who may be authorised by the access right holder to access a location. Each user record may include fields identifying the user's user name and password or other user credentials. A user record may comprise additional attributes such as a parameter indicative of a walking speed or a parameter indicative of a user specific delay, repetition parameter, or the like.

The database further comprises a table 256 of key request records, each key request record associating a user with a location. To this end the access control management system may receive data records from an access right holder, identifying a user (e.g. by means of a user name), a location (e.g. by means of an address), and optionally a validity period indicating a time interval during which the user should be granted access to the location.

The database further comprises a table 250 of technician records, each identifying a technician who may be assigned installation/configuration tasks for installing or otherwise configuring lock control units at locations. Each technician record may include fields identifying the technician's user name and password or other user credentials.

The database further comprises a table 251 of task records, each identifying a technician task to be performed by a technician and at a given location. A task may involve installation of new lock control unit, replacement of an existing by a new lock control unit, maintenance of an existing lock control unit, and/or the like. To this end the task record may include identifying a task type. A task record may further include fields identifying the address at which the task is to be performed, and commands and/or parameters for use during the task. An example of a process for assigning a task to a technician and for completing a task using a technician mobile unit will be described in more detail below.

As part of the configuration process, the access control management system receives information about which lock control unit is installed at the location at which the configuration task has been performed. This allows the database to associate a lock control unit from table 253 with a location from table 254. Consequently, when the system subsequently receives a key request for a given location, the access control management system may use the database to identify which lock control unit is installed at that location and, thus, which electronic key to send to the user identified by the key request.

It will be appreciated that the above information may be organised in tables in a different manner, and that tables may include additional or alternative information.

Figure 3:
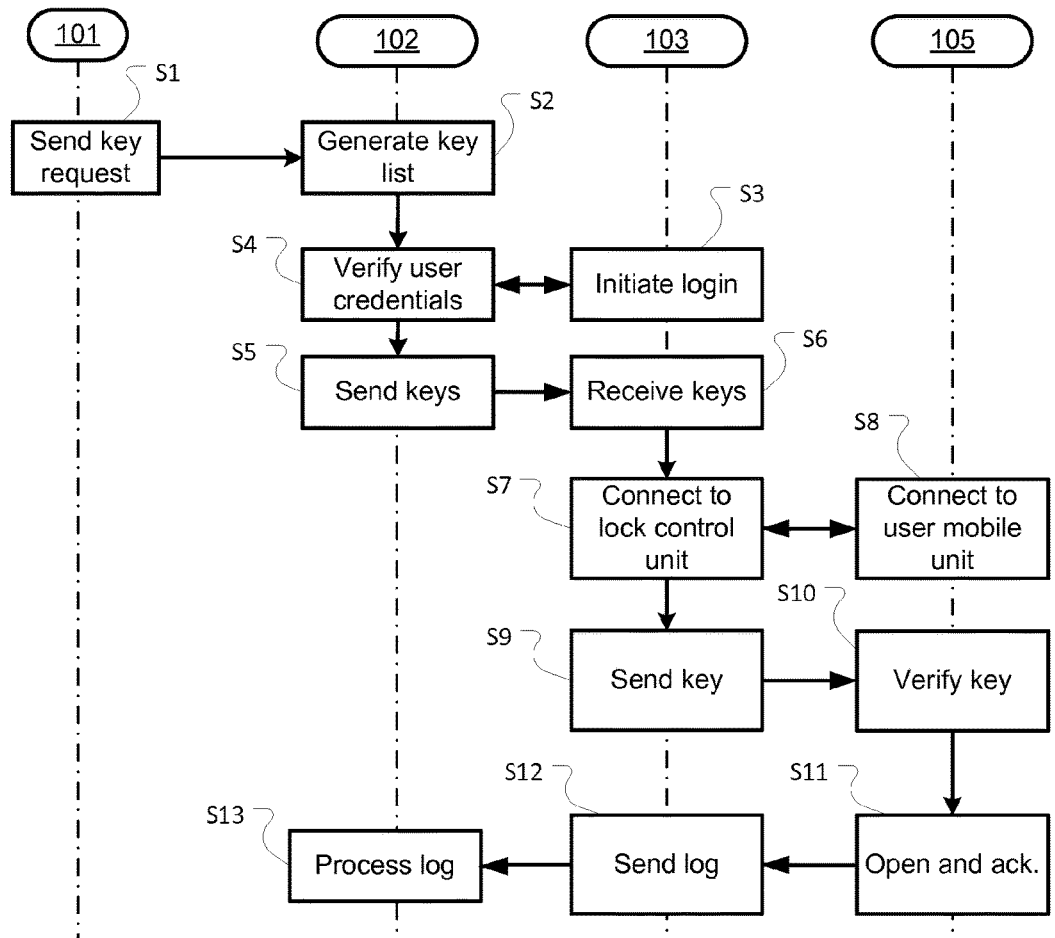
FIG. 3 shows a flow diagram illustrating the access control process.

FIG. 3 shows a flow diagram illustrating the access control process, e.g. as performed by the access control system shown in FIG. 1.

In step S1, the access rights management system 101 communicates one or more data records to the access control management system 102, each data record indicative of a key request. Each key request may include an identifier identifying the user to which the access right is to be granted, and identifier identifying the location to which access is to be granted, and a time interval indicative of the time period during which access should be granted.

In step S2, the access control management system generates respective lists of electronic keys for respective users. Based on the key requests from the access right management system, the access control management system may maintain, for each user, a list of electronic keys to be communicated to the user. For example, the list may comprise the electronic keys associated with all key requests for that particular user that have a validity time interval which expires within a predetermined time window, e.g. the next 24 hours, the next week, or another suitable time window. Alternatively, the access control management system may generate the list responsive to a request from a user.

Each time a user mobile unit 103 should be used as an electronic key device for obtaining access to a number of locations, a number of steps may be performed in order to install the electronic keys for the respective lock control units in the user mobile unit 103. The user mobile unit may initiate a communications session with the access control management system (step S3) so as to download electronic keys. This may be done upon start-up of the mobile unit or upon start-up of a corresponding software application executed by the mobile unit, or triggered by a user input. The communication may be established using any suitable communications protocol providing suitably secure communication, e.g. using a TCP/IP connection via the internet and employing Transport Layer Security (TLS). The user is requested to authenticate himself/herself, e.g. by providing a username and password, or other suitable credentials, which are verified by the access control management system (step S4). Alternatively or additionally, the login may be subject to other authentication procedures, e.g. an authentication of the user mobile unit. In some embodiments, the user mobile unit may further send a unique hardware ID to the access control management system, e.g. a Bluetooth device address of the Bluetooth device of the user mobile unit.

Subject to successful authentication in step S4, in step S5 the access control management system transmits the generated list of electronic keys to the user mobile unit. The electronic keys may be communicated to and stored (step S6) by the user mobile unit in encrypted form, e.g. by an encryption key derived from the user name, password, and hardware ID of the mobile unit. If there are no keys for the user mobile unit, the user mobile unit may terminate the software application. Each electronic key comprises a data item encrypted by a first symmetric key not known to the user mobile unit, thus preventing a user of the user mobile unit to read and tamper with the data item. Each electronic key further comprises or is otherwise associated with data accessible to the user mobile unit, e.g. an associated lock control unit identifier and/or a street address associated with the electronic key, so as to allow the user mobile unit to identify the lock control unit for which the electronic key is valid. The electronic key may further comprise or otherwise be associated with a second symmetric key allowing the user mobile unit to authenticate the lock control unit and to encrypt the communication with the lock control unit.

When the user subsequently approaches a lock control unit, the user mobile unit 103 detects lock control units in its vicinity (step S7). For example, the user mobile unit may operate as a Bluetooth client and scan for other Bluetooth devices in its vicinity. The mobile unit may then determine whether the detected Bluetooth devices are lock control units of the access control system. This determination may e.g. be based on the Bluetooth profile of the lock control unit, or on any suitable hand-shake process. To this end, the lock control unit 105 may act as a Bluetooth server and provide a predetermined profile (step S8). As a part of the determination, the user mobile unit receives a lock control unit ID from the lock control unit. For example, the Bluetooth device address of the lock control unit may serve as a lock control unit ID. The user mobile unit determines whether it has stored an electronic key associated with the lock control unit ID of the detected lock control unit. If this is not the case, the process may continue to scan for lock control units in the vicinity of the user mobile unit. Otherwise the user mobile unit establishes a wireless connection with the lock control unit, e.g. a Bluetooth connection. The wireless connection may be secured to obtain authenticity and privacy using any suitable protection mechanism, e.g. based on symmetric or asymmetric keys. For example, when the communication is based on a symmetric key, e.g. the second symmetric key described above, the lock control unit may be provided with the second symmetric key during manufacturing; and the access control management system may receive the second symmetric key together with the lock control ID of the lock control unit, e.g. the lock control unit's Bluetooth address. The mobile unit may thus receive the second symmetric key as a part of the data package including the electronic keys.

An example of the communication between the user mobile unit and the lock control unit will be described in greater detail below with reference to FIG. 6.

In step S9, the user mobile unit forwards an electronic key to the lock control unit. For example, the electronic key received by the user mobile unit may comprise an encrypted data item, where the data item includes the validity period of the electronic key. The data item may be encrypted using a first symmetric key known only to the lock control unit and the access control management system. This first symmetric key may e.g. be established during manufacturing of the lock control unit and registration of the lock control unit with the access control management system.

In particular, each electronic key may comprise or otherwise be associated with a number of data fields indicative of the attributes of the electronic key. In particular, the electronic key may comprise one or more of the following fields:
1. The lock control unit ID, e.g. the Bluetooth address of the lock control unit.
2. A second cryptographic key (e.g. the second symmetric key described above or a public key associated with the lock control unit) to be used by the user mobile unit to authenticate and/or encrypt communication between the user mobile unit and the lock control unit.
3. The start time of the validity period of the electronic key.

4. The finish time (or alternatively the duration) of the validity period.
5. A duration parameter indicative of how long the lock control unit should keep the lock mechanism activated.
6. A delay parameter indicative of how long the lock control unit should delay activation of the lock mechanism after receipt or after successful authentication of the electronic key.
7. A repetition parameter indicative of the number of repeated activations the lock control unit is to perform.
8. A repetition interval indicative of the time interval between successive repetitions.

At least the start and finish times of the validity period are encrypted by the access control management system using the first symmetric key shared between the control management system and the lock control unit. Optionally, some of the other operational parameters, i.e. the duration parameter, the delay parameter, the repetition parameter and/or the repetition interval may also be encrypted using the first symmetric key.

The lock control unit ID and the second cryptographic key (e.g. the second symmetric key) to be used by the user mobile unit to authenticate and/or encrypt communication between the user mobile unit and the lock control unit are included in a form readable by the user mobile unit, i.e. unencrypted or encrypted using a key accessible to the user mobile unit. In some embodiments, the system may comprise separate keys for authentication and encryption, respectively. Moreover, in some embodiments the mobile unit may derive an encryption key and/or an authentication key from a key received from the access control management system and use the derived key for protecting the communication between the user mobile unit and the lock control unit. It will be appreciated that alternative embodiments of electronic keys may comprise alternative or additional attributes. For example, the electronic key may include a flag indicating whether activation of the lock mechanism requires entry of the user's user name and password. It will further be appreciated that not all of the above parameters may need to be forwarded to the lock control unit.

In step S10, the lock control unit verifies the received electronic key based on the first symmetric key stored by the lock control unit. For example, the lock control unit may decrypt the received message using the first symmetric key, and compare the decrypted message with a verification code included associated with the message. Alternatively or additionally, the lock control unit may verify a validity period of the electronic key. To this end, the lock control unit may further receive a time stamp indicative of the current time from the user mobile unit. Alternatively, the lock control unit may comprise a timer or clock allowing the lock control unit to determine the current time or the lock control unit may comprise a separate interface for receiving a clock signal or other time information.

In step S11 and subject to successful verification, the lock control unit activates the lock mechanism and returns and acknowledgment message to the user mobile unit. In some embodiments, the electronic key includes additional attributes which may cause the lock control unit to delay activation of the lock mechanism by a specified time, to keep the lock mechanism activated for a specified period and/or to repeat activation of the lock mechanism a specified number of times and/or at specified intervals. In some embodiments, the lock control unit may include one or more operational parameters in the acknowledgement message or communicate such operational parameters to the user mobile unit in a separate message.

In step S12, the user mobile unit forwards a log message to the access control management system including information about the successful access to the location. The user mobile unit may then return to step S7 to continue scanning for lock control units. It will be appreciated that, in some embodiments, log messages may not be sent individually after each lock activation, but collected by the mobile unit and forwarded to the access control management system at a later point in time.

The log message may be stored and/or otherwise processed by the access control management system (step S13). In some embodiments, the user mobile unit forwards one or more operation parameters received from the lock control unit to the access control management system, thus allowing the access control management system to monitor correct operation of the lock control unit. If necessary, the access control management unit may thus initiate maintenance on the lock control unit.

For example, some lock control units may be battery driven, and the operational parameter may be a battery status, a low battery flag, or the like, thus allowing the access control management system to create an alert or otherwise initiate a maintenance task where a technician or other person exchanges the battery of the lock control unit.

Figure 4:
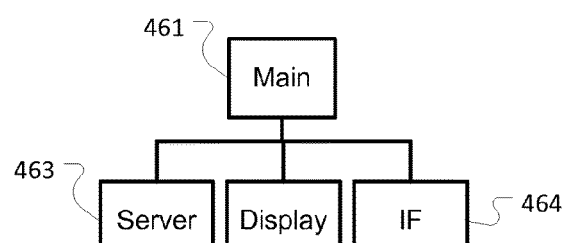
FIG. 4 shows a functional block diagram of the functional blocks of a program stored on and executed by the technician mobile unit.

FIG. 4 shows a functional block diagram of the functional blocks of a program stored on and executed by the user mobile unit. It will be appreciated that a technician mobile unit may have software installed similar to the software of the user mobile unit, where some modules even may be the same, thus allowing reuse of major parts of the program code, and ensuring that the tests and calibrations performed by a technician mobile unit provide reliable information about the subsequent operation of the system when a user mobile unit is used to communicate with the lock control unit.

The program comprises a main module 461, a display module 462, a server module 463, and an interface module 464.

The display module 462 controls the display of information on the display of the mobile unit and the receipt of user-input. The server module 463 handles the communication between the mobile unit and the access control management system using the available communications services, such as webservices, of the mobile unit. In particular, the server module provides functionality for exchanging login information, receiving electronic keys and commands, sending acknowledgement and log messages, and/or the like. Optionally, the server module may provide additional functionality, e.g. functionality for receiving time information from the access control management system and for setting the internal clock of the mobile unit based on the received time information, thus ensuring that clock of the mobile unit is not tampered with and that time information (e.g. time stamps of messages) communicated from the mobile unit is accurate. Other examples of functionality provided by the server module include receiving and executing commands from the access control management system, e.g. commands causing the server module to download and install software updates, to perform a forced logout, etc.

The interface module 464 provides functionality for the communication between the mobile unit and the lock control unit using a suitable communication technology, such as Bluetooth. In particular, the interface module provides functionality for detecting lock control units in the vicinity of the mobile unit, for sending electronic keys and commands to the lock control unit, and for receiving messages from the lock control unit.

Figure 5:
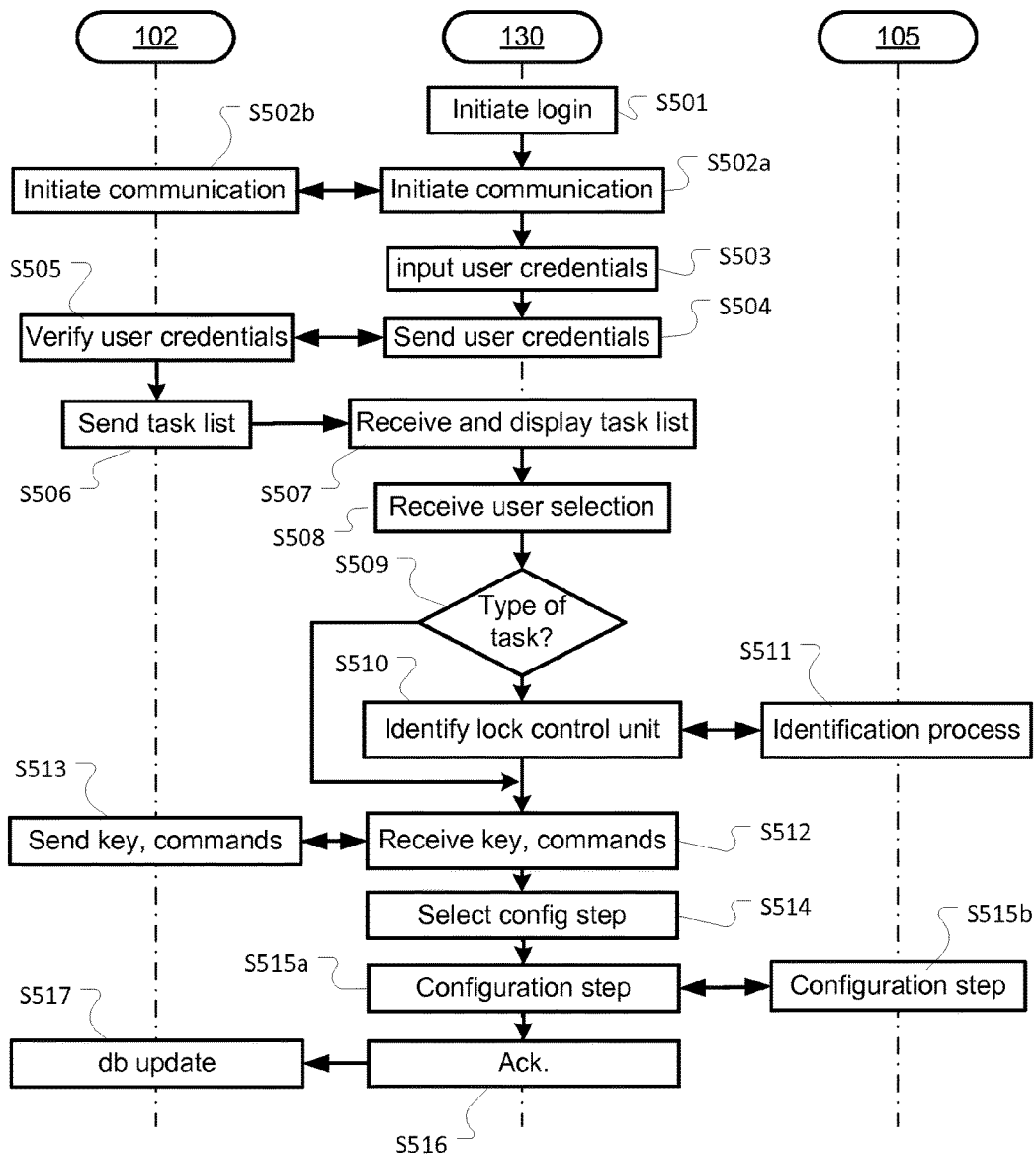
FIG. 5 shows a flow diagram illustrating an embodiment of a configuration process performed by the technician mobile unit.

FIG. 5 is a flow diagram illustrating an embodiment of a configuration process performed by the technician mobile unit 130, e.g. under the control of a program as described with reference to FIG. 4 above.

Prior to installing a given lock control unit at a location, the location and the lock control unit are typically registered in the access control management system 102. Information about locations, e.g. street addresses, may be entered by an operator or received from an external database of addresses, or in any other suitable manner. During production of lock control units, they may be equipped with a communications interface device, e.g. a Bluetooth interface, having an associated interface device ID (e.g. a Bluetooth device address), and programmed with electronic key verification data for one or more electronic keys. Data indicative of lock control units may be entered into the access control management system by an operator or be received from an external system, e.g. a system of a manufacturer of lock control units. The access control management system may e.g. receive a data record for each lock control unit to be used in the access control system. Each data record may e.g. comprise a lock control unit ID, e.g. a serial number, an interface device ID, and electronic key generation data for the one or more electronic keys.

When the technician application is started on the technician mobile unit 130, the main module initialises (step S501) the program and controls the subsequent process.

Subsequently, the server module contacts the access control management system and a communications link is established between the technician mobile unit (step S502a) and the access control management system (step S502b). The communication may be established using any suitable communications protocol providing suitably secure communication, e.g. using a TCP/IP connection via the internet and employing Transport Layer Security (TLS).

In step S503, the display module causes a login dialog to be displayed on the display of the technician mobile unit, and a user is requested to authenticate himself/herself, e.g. by providing a username and password, or other suitable credentials. The display module receives the login information entered by the user and forwards the received information to the main module. Alternatively or additionally, the login may be subject to other authentication procedures, e.g. an authentication of the technician mobile unit. In some embodiments, the technician mobile unit may further send a unique hardware ID to the access control management system, e.g. a Bluetooth device address of the Bluetooth device of the technician mobile unit.

In step S504, the login information is forwarded via the server module to the access control management system 102 for validation, and the access control management system verifies (step S505) the user credentials so as to authenticate the user as an authorized technician, based on user data stored in its database.

In step S506 and upon successful user validation, the access control management system sends a list of maintenance tasks to the technician mobile unit. For example, the task list may be generated based on requests received by the access control management system from access right holders to add one or more locations to the access control system, thus requiring installation of a lock control unit at those locations. The task list may further be based on error reports or maintenance requests received for existing lock control units.

In step S507, the server module of the technician mobile unit receives the task list. If the task list is empty, the user may log off the system; otherwise the process displays the task list on the display of the mobile unit. The task list may comprise at list of locations (e.g. identified by street addresses) at which lock control units are to be installed. It will be appreciated that the task list may comprise additional information, such as a type of task to perform (e.g. installation of a new lock control unit, maintenance of an existing lock control unit, replacement of an existing lock control unit with a new lock control unit, and/or the like), or other relevant information.

In step S508, the technician mobile unit receives a user-selection of one of the listed tasks. Upon selection of a task, additional task-related information may be displayed. When the user confirms the selection of one of the tasks, the process proceeds to step S509; otherwise the process awaits a different selection. It will be appreciated that the selection of a location may be performed in a different manner. For example, the mobile unit may receive information about a single task only, without allowing the technician to select from a list. In another embodiment, some or all tasks may be associated with multiple addresses, and the process may first let the technician select a task, then receive the locations associated with the selected task, and let the technician select one of the received locations.

As mentioned above, there are different types of tasks that may be performed by a technician including e.g. installation of a new lock control unit, replacement of an existing by a new lock control unit, maintenance/repair of an existing lock control unit. The further process flow may depend on the type of task to be performed. Accordingly, in step S509, the mobile unit determines a type of task, e.g. based on an attribute associated with the location and received from the access control management system. If the type of task indicates that a new lock control unit is to be installed at the address, the process proceeds at step S510; if the type of task indicates that the technician is to perform maintenance of an existing lock control unit, the process proceeds at step S512. It will be appreciated, that alternative embodiments may include more or fewer task types, and the process may be divided in more or fewer alternative branches.

In step S510, the main module controls the display module to display a user-interface allowing the user to initiate a scan of lock control units. When the technician has performed the physical installation of a lock control unit, the technician may thus start the scan process. When the display module receives a user input indicative of a command to initiate a scan, the main module controls the interface module to identify all lock control units from which a communications signal is received. During the identification process the lock control units 105 send their lock control unit IDs, e.g. their Bluetooth device addresses, to the technician mobile unit (step S511)

The main module further controls the display module to display a list of lock control unit IDs of the lock control units detected during the scan, thus allowing the technician to select the newly installed lock control unit from the list. To this end, the lock control unit may have its control unit ID or another suitable identifier printed on it or may be marked in another suitable manner allowing the technician to identify the lock control unit ID. For example, the lock control unit may comprise a label, a bar code, or another machine and/or human readable insignia or device. Upon receipt of a user selection of a lock control unit, the process proceeds at step S512.

In step S512, the main module controls the server module to request from the access control management system an electronic key including configuration commands associated with the selected lock control unit. The commands indicate a set of configuration commands to be sent to the lock control unit during the configuration setup. In step S513, the access control management system sends the electronic key and the commands to the technician mobile unit. Upon receipt of the electronic key and commands from the access control management system, the main module determines one or more configuration steps consistent with the received commands and controls the display module to display a list of available configuration steps.

In subsequent step S514, the process awaits a user input indicative of a selection of one of the configuration steps from the list, or an input indicative of a completion of the configuration process. If the received input is indicative of a configuration step, the process proceeds at steps S515a and S515b; otherwise, if the received user selection of a completion of the configuration process, the process proceeds at step S516 to complete the configuration process. In some embodiments, one or more of the configuration steps may be mandatory to be performed before the configuration process may be completed. In such embodiments, the display module may prevent the selection of the completion option until all mandatory configuration steps have been performed. An example of a mandatory configuration step may be a step where the mobile unit sends an "open door" command to the lock control unit, thus allowing the technician to verify that the lock control unit successfully activates the lock mechanism.

In step S515a, the technician mobile unit communicates with the lock control unit to cause the lock control unit to perform the selected configuration step (step S515b), e.g. causing the setting of a configuration parameter in the lock control unit, the sending of an operational parameter value from the lock control unit to the technician mobile unit, and/or the like. Examples of configuration steps will be described in more detail below. A configuration step typically comprises the main module causing the interface module to send a message to the lock control unit, the message including the electronic key, a command, and optionally one or more parameters. The parameter may e.g. be a parameter received from the access control management system or a parameter input by the technician. To this end, upon selection of a configuration step, the display module may prompt the user to input an associated parameter value. The message causes the lock control unit to verify the received electronic key, to perform the received commands, and to return an acknowledgment message to the mobile unit indicative of a result of the command. The result may be displayed on the mobile unit by the display module. Examples of result may include failure to verify the electronic key, failure or acknowledgement of successful performance of the command, one or more parameter values indicative of an operation parameter of the lock control unit, and/or the like.

In step S516, the main module controls the server module to send an acknowledgement message to the access control management system indicative of that the lock control unit is installed at the previously specified location. The acknowledgement message causes the access control management system to update its database by associating the lock control unit with the location (step S517). After sending the acknowledgement message the process may e.g. terminate or return to a previous step, e.g. step S508.

In the following, example of configuration steps for configuring a lock control unit will be described in more detail.

An "open lock" configuration step may comprise sending an "open door" command to the lock control unit so as to cause the lock control unit to activate the lock mechanism so as to provide access to the location. This step allows the technician to verify that the associated electronic key is received and verified successfully by the lock control unit, and that the lock control unit correctly activates the lock mechanism. Optionally, the "open lock" command may comprise a parameter indicative of a time period for which the lock mechanism should be activated, e.g. a number of seconds.

A "get signal strength" configuration step may comprise sending a corresponding command to the lock control unit that causes the lock control unit to send the current setting of the signal strength of the communications interface of the lock control unit. The signal strength may then be displayed on by the display module of the mobile unit.

The transmission power of the wireless communications device, e.g. Bluetooth device, in the lock control unit may be adjusted in order to correspond to the surroundings and the environment. A higher transmission strength results in a user mobile unit being able to detect the lock control unit and to initiate the key exchange with the lock control unit from a larger distance. On the other hand, if the transmission power is low, a mobile unit may detect the lock control unit and initiate a key exchange only when the mobile unit is in close proximity to the lock control unit. As the detection and key exchange process require some time, a user approaching a locked door may arrive at the door before the key exchange process has been completed and the lock has been activated, thus resulting in unnecessary delays. If the transmission strength is too large, a lock may be activated while the user is still relatively far away from, and even out of sight of, the lock when the lock is activated, thus reducing the security of the system. Hence, the transmission power or signal strength of the lock control unit should preferably be adjusted to account for the local environment. The range may depend on the strength of the Bluetooth unit(s) and/or on the surroundings, such as the thickness and the material which walls and door are made of. The maximal distance, which the Bluetooth devices in a mobile unit and in a door unit typically can communicate over, is in the range of 50 meter. Furthermore, the lock control unit may have a lag time indicative of a time interval between a successful key verification until the lock control unit activates the lock mechanism. Another example of a parameter influencing the timing of the lock activation is the time during which the lock control unit activates the lock. Some or all of the above parameters may thus be adjusted so as to suitably calibrate the timing of the lock activation relative to a normal approach of a user holding a user mobile unit.

Accordingly, a "set signal strength" configuration step may comprise sending a corresponding command to the lock control unit that causes the lock control unit to set the signal strength of the communications interface of the lock control unit to a given value or to adjust the current setting by a given increment. The value or increment is communicated by the mobile unit to the lock control unit as a parameter together with the command. The value or increment may be received from the access control management system or set by the user of the mobile unit.

Similar commands may be provided allowing the mobile unit to set other parameters of the lock control unit or manually activate selected functions of the lock control unit, e.g. a lag time or duration of the unlocking signal. For example, a command may cause the lock control unit to turn an audible or a visual indicator, such as an LED, ON or OFF.

A "get software version" configuration step may comprise sending a corresponding command to the lock control unit that causes the lock control unit to send a version identifier of the currently installed software version of the lock control unit to the mobile unit. The software version may then be displayed on by the display module of the mobile unit. Similar commands may be provided allowing the mobile unit to request and receive other parameters from the lock control unit, such as an identifier identifying a hardware version of the lock control unit, a battery status of the lock control unit, a battery voltage, a status of a relay for controlling the lock mechanism, and/or the like.

Figure 6:
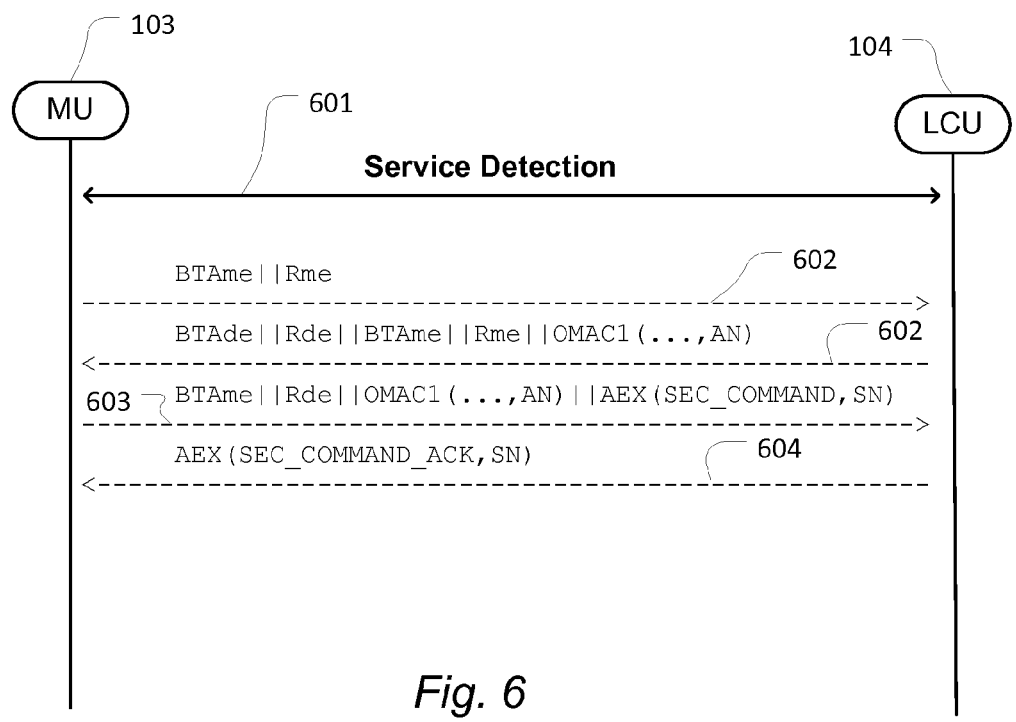
FIG. 6 shows the message flow of an example of the communication between the user mobile unit and the lock control unit.

FIG. 6 shows an example of the communication between the user mobile unit and the lock control unit.

The user mobile unit 103 operates as a Bluetooth client that searches for Bluetooth devices in its proximity and if such devices is a lock control unit, e.g. by searching for Bluetooth devices having a predetermined Bluetooth profile. The lock control unit 104 operates as a Bluetooth server that provides that profile. During an initial service detection process 601, upon detection of a lock control unit, the user mobile unit determines whether it has an electronic key stored in its memory associated with the Bluetooth address of the detected lock control unit.

If the user mobile unit has a corresponding electronic key stored therein, the user mobile unit initiates an authentication and key exchange procedure with the lock control unit. The mutual authentication ensures that the user mobile unit communicates with an authentic lock control unit, and that the lock control unit communicates with a user mobile unit that is in possession of an authentic key.

The authentication is based on an encryption key (e.g. the second symmetric key described above) which the user mobile unit has received from the access control management unit and stored in its memory as a part of the electronic key. The lock control unit has stored a corresponding key which may have been stored therein during manufacturing.

In the present example, the second symmetric key comprises two key parts, an authentication key (AN) for authentication and a key generation key (NAN) for generating a session key (SN) to be used for encrypting the communication between the user mobile unit and the lock control unit.

The user mobile unit ME initiates the authentication by sending a message 602 to the lock control unit comprising the Bluetooth address (BTAme) of the mobile unit and a random number (Rme). The lock control unit responds by sending a message 603 comprising its Bluetooth address (BTAde), a random number (Rde), and the just received Bluetooth address (BTAme) and random number (Rme). The message 603 further comprises a message authentication code (MAC) calculated from the message 603 and the authentication key (AN) of the lock control unit. The MAC may be calculated by any suitable algorithm for calculating message authentication codes, e.g. the one-key MAC algorithm OMAC1.

Based on the MAC, the user mobile unit may thus verify that the lock control unit is authentic. Upon successful authentication, the user mobile unit sends a message 604 comprising BTAme, Rme and a MAC calculated from these values so as to allow the lock control unit to verify the authenticity of the user mobile unit. The message 604 further comprises an open command (SEC_COMMAND) encrypted using the session key SN using a suitable encryption algorithm (AEX). In the present example the encryption is performed using AES encryption standard; however, it will be appreciated that other suitable encryption algorithms may be used instead. Finally, the lock control unit responds with an encrypted acknowledgement message 605 which may further comprise additional information, such as one or more operational attributes of the lock control unit as described herein.

The session key SN may be generated from the random number Rde and based on the encryption key NAN. The integrity of the exchanged commands may be protected by a message authentication code calculated from the command and a nonce, thus further protecting the system against replay attacks The random numbers Rme and Rde may be generated by a suitable hardware circuit or by an algorithm for generating pseudo random numbers. For example, the Rme may be generated by the user mobile unit based on the mobile unit's current time, the user's user name and password, a version number of the program performing the electronic key management, the Bluetooth address of the mobile unit, and/or the like. The Rde may e.g. be generated based on an internal clock of the lock control unit, the Bluetooth address of the lock control unit, a serial number of the lock control unit, and/or the like.

As described above, the command SEC_COMMAND includes an encrypted data item encrypted using a first symmetric key shared by the lock control unit and the access control management system but unknown to the user mobile unit. The encrypted data item further comprises a validity period for the electronic key.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of controlling access to a location, the location being secured by a lock mechanism, the system comprising an access control management system adapted to administrate electronic keys for a plurality of locations and a plurality of users, a user mobile unit to be carried by a user, and a lock control unit operationally coupled to the lock mechanism at said location and adapted to control the lock mechanism, the method comprising:

storing, by the access control management system, a plurality of data records associated with respective lock control units, each data record comprising key generation data for generating an electronic key for a corresponding lock control unit;

communicating a generated electronic key from the access control management system to the user mobile unit, the electronic key being indicative of a predetermined access right to said location, the electronic key having associated with it a lock control unit identifier of the lock control unit at said location;

communicating the electronic key from the user mobile unit to the lock control unit at said location;

authenticating, by the lock control unit, the electronic key and, subject to successful authentication of the electronic key, operating the lock mechanism;

wherein the electronic key comprises a data item cryptographically protected between the access control management system and the lock control unit using a first cryptographic key unknown to the user mobile unit and wherein communicating the electronic key from the user mobile unit to the lock control unit at said location further comprises cryptographically protecting the electronic key using a second cryptographic key.

2. A method according to claim 1, wherein communicating the electronic key from the user mobile unit to the lock control unit comprises:

detecting, by the user mobile unit, one or more lock control units communicating via a wireless communications channel in a proximity of the user mobile unit;

identifying, based on the lock control unit identifier, the lock control unit associated with the location.

3. A method according to claim 2, wherein detecting one or more lock control units communicating via the wireless communications channel in a proximity of the user mobile unit comprises detecting all electronic devices communicating via the wireless communications channel within a communication range of the user mobile unit, and, for each detected device, determining whether the detected device is a lock control unit.

4. A method according to claim 2, wherein the data item comprises a validity period of the electronic key, and wherein authenticating the electronic key comprises obtaining, by the lock control unit, a current time and operating the lock mechanism subject to successful authentication of the electronic key and conditioned on the obtained current time falling within the validity period.

5. A method according to claim 3, wherein the electronic key comprises an operational parameter causing the lock control unit to operate the lock mechanism using the operational parameter.

6. A method according to claim 1, wherein the data item comprises a validity period of the electronic key, and wherein authenticating the electronic key comprises obtaining, by the lock control unit, a current time and operating the lock mechanism subject to successful authentication of the electronic key and conditioned on the obtained current time falling within the validity period.

7. A method according to claim 1, wherein the electronic key comprises an operational parameter causing the lock control unit to operate the lock mechanism using the operational parameter.

8. A method according to claim 7, wherein the electronic key comprises a duration parameter causing the lock control unit to keep the lock mechanism activated for a period of time specified by the duration parameter.

9. A method according to claim 8, wherein the electronic key comprises a delay parameter causing the lock control unit to delay operation of the lock mechanism by a period of time specified by the delay parameter.

10. A method according to claim 8, wherein the electronic key comprises a repetition parameter causing the lock control unit to repeat operation of the lock mechanism a number of times specified by the repetition parameter.

11. A method according to claim 7, wherein the electronic key comprises a delay parameter causing the lock control unit to delay operation of the lock mechanism by a period of time specified by the delay parameter.

12. A method according to claim 11, wherein the electronic key comprises a repetition interval parameter causing the lock control unit to repeat operation of the lock mechanism at a time interval specified by the repetition interval parameter.

13. A method according to claim 7, wherein the electronic key comprises a repetition parameter causing the lock control unit to repeat operation of the lock mechanism a number of times specified by the repetition parameter.

14. A method according to claim 7, wherein the electronic key comprises a repetition interval parameter causing the lock control unit to repeat operation of the lock mechanism at a time interval specified by the repetition interval parameter.

15. A method according to claim 1, wherein communicating the electronic key from the user mobile unit to the lock control unit comprises verifying, by the user mobile unit, the authenticity of the lock control unit based on the second cryptographic key and/or encrypting the communication between the user mobile unit and the lock control unit using said second cryptographic key.

16. A method according to claim 1, wherein communicating the electronic key from the access control management system to the user mobile unit comprises, authenticating, by the access control management system, a user of the user mobile unit.

17. A method according to claim 1, further comprising, receiving, by the user mobile unit, a message from the lock control unit indicative of at least one operational parameter of the lock control unit; and sending a message indicative of the received operational parameter to the access control management system.

18. An access control management system for controlling access to a plurality of locations, each location being secured by a respective lock mechanism, each lock mechanism being controlled by a lock control unit, the lock control unit having associated with it a lock control unit identifier, the lock control unit comprising means for wireless communication via a wireless communications channel with a user mobile unit, and adapted to receive an electronic key from a user mobile unit, to verify a received electronic key and, subject to successful verification, to activate the lock mechanism, the access control management system being configured to send a message to a user mobile unit, the user mobile unit comprising means for wireless communication via the wireless communications channel with the lock control unit, the message comprising an electronic key, wherein at least a data item comprised in the electronic key is cryptographically protected between the access control management system and the lock control unit using a first cryptographic key unknown to the use mobile unit and wherein communication of the electronic key from the user mobile unit to the lock control unit is cryptographically protected using a second cryptographic key.

19. A lock control unit operationally connectable to a lock mechanism and adapted to control the lock mechanism for securing a location, the lock control unit having associated with it a lock control unit identifier and a key verification data item allowing verification of a data item cryptographically protected between an access control management system for distributing electronic keys to user mobile units and the lock control unit, and the lock control unit comprising a processing unit and first wireless communications means adapted to communicate with wireless communication means of the user mobile unit, the lock control unit being configured to receive an electronic key from a user mobile unit, to verify the received electronic key based on a cryptographic key stored in a memory of the lock control unit and, subject to successful verification, to activate the lock mechanism, wherein the electronic key comprises a data item that is cryptographically protected between the access control management system and the lock control unit using first cryptographic key unknown to the user mobile unit and wherein communication of the electronic key from the user mobile unit to the lock control unit is cryptographically protected using a second cryptographic key.

* * * * *